United States Patent [19]

Esselborn et al.

[11] Patent Number: 5,145,914

[45] Date of Patent: Sep. 8, 1992

[54] POLYACRYLATE ESTERS WITH AMMONIUM SALT GROUPS

[75] Inventors: Eberhard Esselborn, Essen; Jürgen Fock, Düsseldorf; Helmut Lammerting, Herbede, all of Fed. Rep. of Germany

[73] Assignee: TH. Goldschmidt AG, Essen, Fed. Rep. of Germany

[21] Appl. No.: 665,778

[22] Filed: Mar. 7, 1991

[30] Foreign Application Priority Data

Mar. 19, 1990 [DE] Fed. Rep. of Germany ........ 4008761

[51] Int. Cl.$^5$ ................................. C08F 8/32
[52] U.S. Cl. ................ 525/329.5; 525/329.6; 525/330.5; 525/380
[58] Field of Search ............... 525/329.5, 329.6, 330.5, 525/380

[56] References Cited

U.S. PATENT DOCUMENTS

| | | | |
|---|---|---|---|
| 2,862,893 | 12/1958 | Hwa | 525/330.5 |
| 3,651,028 | 3/1972 | Maemoto et al. | 525/330.5 |
| 4,158,736 | 6/1979 | Lewis et al. | 525/329.2 |
| 4,246,370 | 1/1981 | Lewis et al. | 525/329.2 |
| 4,356,288 | 10/1982 | Lewis et al. | 525/329.2 |

FOREIGN PATENT DOCUMENTS 2262588 11/1973 Fed. Rep. of Germany .

*Primary Examiner*—Bernard Lipman

*Attorney, Agent, or Firm*—Anderson Kill Oshinsky

[57] ABSTRACT

Polyacrylate esters with ammonium salt groups obtained by the transesterification of alkyl polyacrylates produced by free radical polymerization are disclosed, wherein the alkyl groups of the acrylate esters have 1 to 8 carbon atoms, up to 50% of the acrylate esters can be replaced by the corresponding methacrylate esters and the transesterification is carried out with a) compounds of the formula

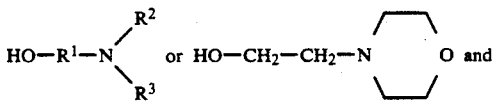

b) saturated or unsaturated aliphatic alcohols having 8 to 22 carbon atoms or alkoxylated alkylphenols having 9 to 27 carbon atoms in the alkylphenol group, wherein the molar ratio of component a) to component b) is 1:9 to 9:1, in such amount that 5 to 70% of the ester groups are transesterified and subsequently, the transesterification product is transformed into a salt. The new polyacrylate esters with ammonium salt groups are distinguished by containing a lesser amount of low molecular weight compounds than products obtained through copolymerization and can be used as cationic surfactants and particularly, as active ingredients of metal adjuvants.

10 Claims, No Drawings

POLYACRYLATE ESTERS WITH AMMONIUM SALT GROUPS

BACKGROUND OF INVENTION

This invention is directed to polyacrylate esters with ammonium salt groups as well as to their use as cationic surfactants, particularly as active ingredients of metal adjuvants.

Ammonium salts of organic amines have long been used as cationic wetting agents and emulsifiers. They can be used in the textile industry as antistatic agents and to improve the handle of textiles, and in yarn preparations to improve slippage capabilities and processing characteristics, such as sewing properties. Ammonium salts of organic amines are used for selective oleophilization in the flotation of salts, such as alkali salts, and of ores, such as zinc ores. They can act as corrosion protection agents in suitable systems and are used as metal adjuvants, for example for the preparation of drilling and cutting fluids and as surface active materials for the moistening of wet metal surfaces. Ammonium salts of selected organic compounds are suitable as adhesives in road construction and for grinding and flushing pigments.

Polymeric compounds which contain a majority of the ammonium salt groups linked in a lateral position in comb-like fashion are of particular interest, since these compounds can be adapted optimally to the intended application with respect to the solubility and the number of ammonium groups in the polymeric molecule.

Suitable polymeric compounds in which ammonium salt groups can be linked laterally include the polyacrylate esters. These can be obtained by the copolymerization of acrylate esters and acrylate ester derivatives with tertiary amino groups, which are converted into the ammonium salts after the polymerization. In addition, further monomers, such as styrene, methyl, ethyl, butyl, and dodecyl (meth)acrylate, vinyl acetate, vinyl propionate, N-vinylpyrrolidone, acrylamide and acrylonitrile can be copolymerized.

The free radical copolymerization of the aforementioned monomers results in polymers with a very broad distribution of molecular weights. Accordingly, the molecular weight distribution curve is flat and moreover has two or more maxima, which indicate that the polymerization product is relatively heterogeneous. It may be assumed that the reason for this lies in copolymerization parameters of the individual monomers, which deviate appreciably from the ratio of 1, and is caused, in particular, by the content of tertiary or quaternary nitrogen in the comonomers.

It has been ascertained that such polymers obtained by copolymerization contain portions which are physiologically hazardous and may also have toxic properties. It is suspected that these undesirable properties may be attributed to the low molecular weight portions of the polymer. The removal of these portions from the polymer is not possible in an economic manner. For many applications, the physiological safety of products is an absolute prerequisite for their usability. It is therefore of particular interest to synthesize polyacrylate esters with quaternary ammonium groups which are free of physiologically hazardous components.

The use of an anionic polymerization method, such as that described in the German Offenlegungsschrift 22 62 588, for the synthesis of acrylate polymers with a molecular weight of 500 to 5,000 does not represent a useful solution to the aforementioned task. The danger of gelling the reaction products is high. Moreover, the transfer of an anionic polymerization method to an industrial scale is also rather problematic for safety reasons.

SUMMARY OF THE INVENTION

An object of the invention is to provide a method of synthesis for polyacrylate esters with quaternary ammonium salt groups which yields polymers containing the least possible amount of low molecular weight products.

Another important object of the invention is to provide polyacrylate esters with quaternary ammonium salt groups which have desired properties for use as cationic surfactants and are physiologically safe.

These and other object of the invention are attained by the invention described below.

It has been discovered that polymers which contain only a very small portion of low molecular weight products are obtained by the transesterification of suitable polyacrylate esters with a mixture of selected aminoalcohols and long-chain aliphatic alcohols. The acrylate esters with tertiary amino groups, which are formed as intermediates, are converted in a second step of the method by salt formation (protonation) with organic or inorganic, physiologically safe acids into the desired polyacrylate esters with ammonium salt groups.

According to the invention, polyacrylate esters with ammonium salt groups are obtained by the transesterification of alkyl polyacrylates produced by free radical polymerization, wherein the alkyl groups of the acrylate ester have 1 to 8 carbon atoms, up to 50% of the acrylate esters may be replaced by the corresponding methacrylate esters, and the transesterification is carried out in the presence of a transesterification catalyst, at a temperature of 70° to 140° C., optionally in the presence of a solvent, with a) a compound of the formula

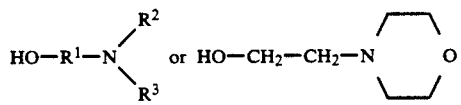

wherein $R^1$ is a divalent group of the formula $-(CH_2)_q-$, $-CH(R^4)-CH_2-$ or $-(C_nH_{2n}O)_m-C_pH_{2p}-$, in which $R^4$ is an alkyl group with 1 to 16 carbon atoms, q=2, 3 or 4, n=2, 3 or 4, m=1 to 20, p=2, 3 or 4 and $R^2$ and $R^3$ are alkyl groups with 1 to 18 carbon atoms and b) saturated or unsaturated aliphatic alcohols with 8 to 22 carbon atoms or alkoxylated alkylphenols with 9 to 27 carbon atoms in the alkylphenol group, wherein the molar ratio of component a) to component b) is 1:9 to 9:1, in such amounts that 5 to 70% of the ester groups are transesterified, and subsequently the transesterification product is transformed into the corresponding salt by reaction with an organic carboxylic acid having 1 to 6 carbon atoms or an inorganic acid.

DESCRIPTION OF THE INVENTION

According to the invention, the transesterification is carried out with component a) and b) having the formulas set forth above. With respect to the compounds useful as component a), $R^1$ is a divalent group having the formula:

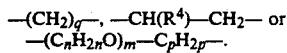
$$-(CH_2)_q-, \; -CH(R^4)-CH_2- \text{ or}$$
$$-(C_nH_{2n}O)_m-C_pH_{2p}-.$$

Examples of such groups are $-(CH_2)_4$; $-CH(CH_3)-CH_2-$; $-CH(C_6H_{13})-CH_2$; $-(CH_2)_2O(CH_2)_2-$; $-(CH_2)_3O(CH_2)_2-$; $-(CH_2)_2O(CH_2)_2O(CH_2)_3-$ and $-(CH_2)_3O-CH(CH_3)-CH_2-$. Particularly preferred are $-(CH_2)_q-$ groups as well as $-CH(R^4)-CH_2-$ groups, in which $R^4$ is a methyl or ethyl group. Among the ether groups, those are preferred in which n and p have a value of 2 or 3, while m preferably has a value of 1 to 10.

$R^2$ and $R^3$ are alkyl groups with 1 to 18 carbon atoms. The alkyl groups may be linear or branched. Preferred are alkyl groups with 1 to 6 carbon atoms. Particularly preferred are alkyl groups with 1 to 4 carbon atoms, such as the methyl, ethyl, propyl, isopropyl, butyl and isobutyl groups.

Within the polymeric molecule, the groups and subscripts can assume different meanings and values. Due to this, the subscripts can also assume fractional values in the average polymer molecule.

Component b) can be a saturated or unsaturated aliphatic alcohol with 8 to 22 carbon atoms. Alcohols with 10 to 18 carbon atoms are particularly preferred and it is also possible to use mixtures of alcohols of different chain length. Examples of suitable alcohols are octyl, decyl, dodecyl, hexadecyl or octadecyl alcohol, behenyl alcohol, oleyl alcohol and the synthetic alcohols with the desired number of carbon atoms. If component b) is an alkoxylated alkylphenol, the alkylphenol has 9 to 27 carbon atoms. Examples of suitable alkoxylated alkylphenols are the ethoxylates of alkylphenols, such as hexyl, octyl, nonyl, dodecyl or dinonylphenol. At the same time, the alkylphenols have undergone an addition reaction with, on the average, 1 to 10 and preferably 1 to 3 moles of ethylene oxide.

The molar ratio of a), i.e. the dialkylaminoalkanols or β-hydroxyethylmorpholine to the saturated or unsaturated aliphatic alcohols or alkoxylated alkylphenols b) is 1:9 to 9:1; a range of 1:3 to 3:1 is preferred.

For the transesterification, alkyl polyacrylates are used, the alkyl groups of which have 1 to 8 carbon atoms. Preferably, alkyl esters are used in which the alkyl groups contain 1 to 4 carbon atoms. Therefore, particularly preferred for the transesterification are the methyl, ethyl and n-butyl esters of polyacrylic acid.

Transesterification of the polyacrylate esters with the mixture of dialkylaminoalcohol or β-hydroxyethylmorpholine and long-chain aliphatic alcohol or alkoxylated alkylphenol is carried out in a known manner. Advisably, it takes place in the presence of a known transesterification catalyst, such as alkyl titanates or alkali alcoholates and optionally is carried out in the presence of a solvent, such as toluene, xylene or gasoline fractions with a boiling point range of 80° to 160° C. The solvent serves primarily to carry the alcohol which is set free during transesterification out of the reaction mixture. At the same time, the solvent used limits the transesterification temperatures, which should fall within the range of 70° to 150° C.

Moreover, the transesterification reaction should be conducted with such quantitative relationships that 5 to 70%, preferably 20 to 70% and particularly 30 to 70% of the alkyl esters are transesterified.

The polyacrylate esters with tertiary amino groups are obtained as an intermediate. These compounds can also be used in the field of textile auxiliaries and metal adjuvants and for many other purposes.

In a second step of the method, the intermediate transesterification product is converted into the form of the ammonium salt by reaction with an organic carboxylic acid having 1 to 6 carbon atoms or with inorganic acids by protonation.

The organic and inorganic acids should be physiologically safe for the intended use. For this reason, acetic acid or propionic acid is preferred as the organic acid and phosphoric acid as inorganic acid.

Within the inventive polyacrylate esters with ammonium salt groups, those are preferred which are obtained by transesterification of methyl polyacrylate esters with a mixture of dimethylaminoethanol or diethylaminoethanol and aliphatic alcohols having a chain length of 8 to 22 and preferably 10 to 18 carbon atoms or alkoxylated alkylphenols, wherein 20 to 50% of the ester groups are transesterified, and subsequently converted to the salt form.

Particularly preferred are polyacrylate esters with ammonium salt groups, the polymers of which have an average molecular weight of about 1,000 to 50,000.

In contrast to copolymers obtained according to the state of the art by copolymerizing acrylate esters or acrylate ester derivatives with ammonium salt groups, the inventive polymers have a more uniform structure. The content of low molecular weight portions is reduced quite substantially and the copolymers of the invention do not have any toxic or other physiological harmful properties.

Up to 50% of the alkyl acrylate esters can be replaced by the corresponding alkyl methacrylate esters.

It is clear to those skilled in the art that other comonomers, such as styrene, acrylamide, acrylonitrile or alkyl methacrylate esters, may also be contained in copolymerized form in the alkyl polyacrylate esters which are used as starting compounds for the transesterification reaction.

A further object of the invention is the use of the compounds as cationic surfactants, particularly as emulsifiers in metal adjuvants, such as drilling and cutting oils, as auxiliaries in the textile industry or as release agents for removing plastic parts, particularly polyurethane foam objects, from molds.

In the following illustrative examples, which further illustrate the best mode currently contemplated for carrying out the invention, the synthesis and properties of compounds of the invention are explained in greater detail; however, the illustrative examples must not be construed as limiting the invention in any manner.

EXAMPLE 1

Synthesis of Poly(Methyl Acrylate) by Free Radical Polymerization (Not of the Invention)

A solution of 0.6 g of azodiisobutyronitrile and 20.2 g of dodecyl mercaptan in 50 g of toluene and 280 g (approximately 3.25 moles) of methyl acrylate is added within 2 hours to a reactor filled with 53 g of toluene;

the solvent added has a temperature of 100° C. and is under an atmosphere of nitrogen. After that, a further 0.9 g of azodiisobutyronitrile, dissolved in 20 g of methyl ethyl ketone, are added within 0.5 hours. Finally, the reaction mixture is heated for a further hour at the same temperature of 100° C. At the end of the reaction, the solvent is distilled off. A colorless, viscous liquid, with a refractive index of 1.4802, remains behind. Gel chromatographic analysis reveals that the polymer obtained has a number average molecular weight $\overline{M}_n$ of 1950 and a weight average molecular weight $\overline{M}_w$ of 3330; the nonuniformity coefficient accordingly is 1.71. The residual monomer content amounts to 0.1%.

EXAMPLES 2 TO 5

Synthesis of Poly(Methyl Acrylates) of Different Molecular Weights by Free Radical Polymerization (Not of the Invention)

The method of Example 1 is followed with the exception that the content of dodecyl mercaptan is varied. The dependence of the number average and weight average molecular weights on the content of dodecyl mercaptan is shown in Table 1.

TABLE 1

| Poly(methyl acrylate) from Example | Dodecyl Mercaptan (weight %) | Molecular weight $M_n$ | Molecular weight $M_w$ | Non-uniformity Coefficient |
| --- | --- | --- | --- | --- |
| 2 | 20.10 | 663 | 955 | 1.44 |
| 3 | 13.42 | 941 | 1,435 | 1.53 |
| 4 | 2.95 | 4,453 | 11,346 | 2.55 |
| 5 | 0.43 | 16,750 | 68,500 | 4.09 |

EXAMPLE 6

Synthesis of Poly(n-Butyl Acrylate) by Free Radical Polymerization (Not of the Invention)

The method of Example 3 is followed with the difference that n-butyl acrylate is used instead of methyl acrylate.

Gel chromatographic analysis reveals that the polymer obtained has a number average molecular weight $\overline{M}_n$ of 910 and a weight average molecular weight $\overline{M}_w$ of 1450; the nonuniformity coefficient accordingly is 1.59. The residual monomer content is determined to be less than 0.1%.

EXAMPLE 7

Synthesis of a Methyl Acrylate/Methyl Methacrylate Copolymer by Free Radical Polymerization (Not of the Invention)

The method of Example 1 is followed, with the exception that instead of an amount of 280 g (approximately 3.25 moles) of methyl acrylate, 140 g (approximately 1.63 moles) of methyl acrylate and 140 g (approximately 1.4 moles) of methyl methacrylate are used.

Gel chromatographic analysis reveals that the polymer obtained has a number average molecular weight $\overline{M}_n$ of 2,280 and a weight average molecular weight $\overline{M}_w$ of 4,390; the nonuniformity coefficient accordingly is 1.93. The residual monomer content is determined to be about 0.15%.

EXAMPLE 8 A

Transesterification of Poly(Methyl Acrylate) with Diethylaminoethanol and Oleyl Alcohol The poly(methyl acrylate) of Example 3 (99.5 g), dissolved in 100 g of toluene, is heated to 120° C. under nitrogen together with 33.9 g (0.29 moles) of diethylaminoethanol and 81.8 g (0.29 moles) of oleyl alcohol. At first, traces of water which may be present are removed by azeotropic distillation. After that, 0.4 g of of sodium methylate is added as transesterification catalyst. The methanol formed during the transesterification is removed from the toluene by fractional distillation. Additional 0.35 g amounts of sodium methylate are added after 2 hours and after 4 hours. The reaction is concluded after about 6 hours. The end of the reaction is indicated by a stillhead temperature of about 110° C.

The proportion of diethylaminoethanol of 0.28%, determined by gas chromatographic analysis, corresponds to a conversion of 97.8%. In the reaction mixture of 1.2% of oleyl alcohol remains; this corresponds to a conversion of 95.7%. The methanol content in the distillate is 31.1% and corresponds to a conversion of 93.9%.

EXAMPLES 9 A TO 31 A

Transesterification of Alkyl Polyacrylates or of Methyl Acrylate/Methyl Methacrylate Copolymers of Different Molecular Weights with Different Dialkylaminoalkanols and Fatty Alcohols Basically, the method of Example 8 A is followed, with the exception that different dialkylaminoalkanols and fatty alcohols are used in varying molar ratios. Instead of poly(methyl acrylate), poly(n-butyl acrylate) or a methyl acrylate/methyl methacrylate is used in some cases and, instead of isopropyl titanate, sodium methylate is used as the transesterification catalyst in some cases. In Table 2, the type or Example No. and amount of the polymer used are given, as well as the type and amount of the fatty alcohol, the type and amount of the dialkylaminoalkanol or of the β-hydroxyethylmorpholine, the type and amount of the catalyst, the theoretical degree of substitution as a ratio of the number of theoretically substituted ester groups to the number of ester groups originally present and the transesterification yield from the amount of methanol set free as a percentage of the number of ester groups actually substituted to the number of ester groups theoretically substituted.

TABLE 2

| Example No. | Polyacrylate Example No. | Amount (g) | Fatty Alcohol Type | Amount (moles) | Amount (g) | Dialkylaminoalcohol Type | Amount (moles) | Amount (g) | Catalyst Type | Amount (g) | Theoretical Degree of Substitution | Yield (%) |
| --- | --- | --- | --- | --- | --- | --- | --- | --- | --- | --- | --- | --- |
| 9 A | 2 | 107.9 | OLA | 0.29 | 81.8 | DEAE | 0.29 | 33.9 | IPT | 1.8 | 0.58 | 99.0 |
| 10 A | 3 | 99.5 | OLA | 0.25 | 70.8 | DEAB | 0.25 | 36.3 | IPT | 2.0 | 0.50 | 98.0 |
| 11 A | 3 | 99.5 | OLA | 0.29 | 81.8 | DEAE | 0.29 | 33.9 | IPT | 2.1 | 0.58 | 98.3 |
| 12 A | 3 | 99.5 | OLA | 0.17 | 47.4 | DEAE | 0.41 | 48.1 | IPT | 1.7 | 0.58 | 95.6 |
| 13 A | 3 | 99.5 | OLA | 0.31 | 88.4 | DEAE | 0.27 | 31.1 | IPT | 1.9 | 0.58 | 98.0 |
| 14 A | 3 | 99.5 | OLA | 0.25 | 69.5 | DEAE | 0.33 | 38.9 | IPT | 1.7 | 0.58 | 97.9 |
| 15 A | 3 | 99.5 | OLA | 0.31 | 88.3 | DEAE | 0.27 | 31.1 | IPT | 2.0 | 0.58 | 98.2 |

TABLE 2-continued

| Example No. | Polyacrylate Example No. | Fatty Alcohol Type | Amount (moles) | Amount (g) | Dialkylaminoalcohol Type | Amount (moles) | Amount (g) | Catalyst Type | Amount (g) | Theoretical Degree of Substitution | Yield (%) |
|---|---|---|---|---|---|---|---|---|---|---|---|
| 16 A | 3 | OLA | 0.31 | 75.1 | DEAE | 0.31 | 36.6 | IPT | 1.9 | 0.58 | 98.5 |
| 17 A | 3 | TFA | 0.20 | 52.0 | DEAE | 0.20 | 23.4 | IPT | 1.8 | 0.40 | 98.2 |
| 18 A | 3 | BHA | 0.15 | 47.5 | DEAE | 0.20 | 23.4 | IPT | 2.0 | 0.35 | 97.6 |
| 19 A | 3 | OLA | 0.29 | 81.8 | DMADG | 0.29 | 38.5 | IPT | 2.2 | 0.58 | 97.7 |
| 20 A | 1 | DNPHE | 0.05 | 62.4 | DMAE | 0.40 | 35.6 | NaOCH$_3$ | 1.2 | 0.45 | 98.3 |
| 21 A | 1 | OLA | 0.27 | 75.9 | DEAE | 0.27 | 31.4 | IPT | 2.0 | 0.54 | 98.0 |
| 22 A | 1 | OLA | 0.43 | 121.4 | DEAE | 0.11 | 12.5 | IPT | 2.3 | 0.54 | 96.9 |
| 23 A | 1 | OLA | 0.16 | 44.0 | DEAE | 0.38 | 44.6 | IPT | 1.5 | 0.54 | 97.8 |
| 24 A | 1 | OCA | 0.47 | 60.6 | DMAE | 0.05 | 4.45 | NaOCH$_3$ | 1.1 | 0.52 | 97.4 |
| 25 A | 4 | OCA | 0.48 | 62.3 | DEAE | 0.22 | 25.8 | IPT | 1.6 | 0.70 | 96.9 |
| 26 A | 4 | NPHE | 0.13 | 60.4 | DEAE | 0.21 | 25.0 | IPT | 1.7 | 0.34 | 98.5 |
| 27 A | 4 | BHA | 0.06 | 19.0 | DMAE | 0.54 | 48.1 | NaOCH$_3$ | 1.2 | 0.60 | 95.7 |
| 28 A | 5 | OLA | 0.25 | 70.8 | DEAE | 0.25 | 29.3 | IPT | 2.1 | 0.50 | 95.2 |
| 29 A | 3 | OLA | 0.25 | 70.8 | HEMO | 0.25 | 32.7 | IPT | 2.1 | 0.50 | 94.2 |
| 30 A | 1 | OLA | 0.27 | 75.9 | DMAB | 0.27 | 31.6 | IPT | 2.0 | 0.50 | 96.5 |
| 31 A | 7 | OLA | 0.13 | 70.8 | DEAE | 0.13 | 15.2 | IPT | 2.5 | 0.25 | 94.8 |

Key for Table 2:
BHA = behenyl alcohol
DEAB = diethylaminobutanol
DEAE = diethylaminoethanol
DMADG = dimethylaminodiglycol
DMAE = dimethylaminoethanol
DNPHE = dinonylphenol ethoxylate (25 moles EO)
IPT = isopropyl titanate
NPHE = nonylphenol ethoxylate (3 moles EO)
OCA = octyl alcohol
OLA = oleyl alcohol
TFA = tallow fatty alcohol
HEMO = β-hydroxyethylmorpholine
DMAB = 4-dimethylaminobutan-1-ol Theoretical degree of substitution =

$$\frac{\text{Number of theoretically substituted ester groups}}{\text{Number of ester groups originally present}}$$

Percentage yield =

$$\frac{\text{Number of ester groups actually substituted*}}{\text{Number of ester groups theoretically substituted}}$$

*determined from the amount of methanol set free

EXAMPLE 8 B

Protonation of the Transesterification Product of Poly(Methyl Acrylate), Diethylaminoethanol and Oleyl Alcohol The product (178 g), obtained in accordance with Example 8 A dissolved in 70 g of toluene, is freed from solvent by distillation at 95° C. and 15 torr. After that, 17.6 g (=95 mole percent based on the tertiary nitrogen) of propionic acid are added within 1 hour with stirring. The pH of a 10% aqueous solution, subsequently determined, is 5.1.

EXAMPLES 9 B TO 38 B

Protonation of Various Transesterification Products with Different Carboxylic acids or Organic Acids Basically, the method of Example 8 B is followed with the exception that the various transesterification products from Examples 8 A to 30 A are reacted with different carboxylic acids or inorganic acids. The transesterification product used, the nature of the acid and the amount in mole percent, based on the tertiary nitrogen group, as well as the resulting pH are given in Table 3.

TABLE 3

| Example No. | Transesterification Product from Example No. | Acid Type | Amount (mole %) | pH* |
|---|---|---|---|---|
| 8 B | 8 A | PS | 95 | 5.1 |
| 9 B | 8 A | PS | 80 | 5.2 |
| 10 B | 8 A | PS | 100 | 5.0 |
| 11 B | 9 A | PS | 80 | 5.2 |
| 12 B | 10 A | PS | 80 | 5.2 |
| 13 B | 11 A | ES | 80 | 5.0 |
| 14 B | 11 A | PHS | 80 | 3.1 |
| 15 B | 11 A | OES | 80 | 8.8 |
| 16 B | 11 A | OES/PHS 1:1 | 80 | 5.7 |
| 17 B | 11 A | STS | 80 | 8.5 |
| 18 B | 11 A | BS | 80 | 5.5 |
| 19 B | 11 A | EHS | 95 | 5.8 |
| 20 B | 12 A | PS | 95 | 5.1 |
| 21 B | 13 A | EHS | 95 | 5.7 |
| 22 B | 14 A | EHS | 95 | 6.1 |
| 23 B | 15 A | PS | 90 | 5.3 |
| 24 B | 16 A | PS | 95 | 5.1 |
| 25 B | 17 A | PS | 80 | 5.4 |
| 26 B | 18 A | PS | 80 | 5.3 |
| 27 B | 19 A | PS | 80 | 5.2 |
| 28 B | 20 A | PS | 80 | 5.5 |
| 29 B | 21 A | PS | 95 | 5.0 |
| 30 B | 22 A | PS | 95 | 5.1 |
| 31 B | 23 A | PS | 95 | 5.2 |
| 32 B | 24 A | PHS | 80 | 3.7 |
| 33 B | 25 A | PS | 80 | 5.4 |
| 34 B | 26 A | PS | 80 | 5.2 |
| 35 B | 27 A | EHS | 95 | 5.9 |
| 36 B | 28 A | PS | 80 | 5.2 |
| 37 B | 29 A | PS | 80 | 5.3 |
| 38 B | 30 A | PS | 80 | 5.4 |

*pH of a 10% aqueous solution

Key for Table 3:
BS = benzoic acid
EHS = 2-ethylhexanoic acid
ES = acetic acid
OES = oleic acid
PHS = phosphoric acid
PS = propionic acid
STS = stearic acid

EXAMPLE 39

Synthesis of a Copolymer Containing Ammonium Groups and Fatty Alcohol Groups by Free Radical Polymerization (not of the invention)

A solution of 0.6 g of azodiisobutyronitrile and 20.2 g of dodecyl mercaptan in 72.2 g (approximately 0.84 moles) of methyl acrylate, 71.8 (approximately 0.42 moles) of diethylaminoethyl acrylate and 135.8 g (0.42 moles) of stearyl acrylate dissolved in 50 g of toluene are added within 2 hours to a reactor filled with 53 g of toluene; the solvent in the reactor is at a temperature of 100° C. under an atmosphere of nitrogen. After that, 0.9 g of azodiisobutyronitrile in 20 g of methyl ethyl ketone are added once again within a period of 0.5 hours and the reaction mixture is finally heated for a further hour at a constant temperature of 100° C. At the end of the reaction, the solvent and unreacted monomers are removed by vacuum distillation.

Gel chromatographic analysis reveals that the polymer obtained has a number average molecular weight $\overline{M}_n$ of 1370 and a weight average molecular weight $\overline{M}_w$ of 3150; the nonuniformity coefficient accordingly is 2.3. The residual monomer content after vacuum distillation is determined to be 0.1%. In the gel phase chromatogram, a peak in the low molecular weight range indicates the presence of low molecular weight portions. The product obtained is reacted as in Example 8 B with 95 mole percent of propionic acid, based on the tertiary amino groups.

INVESTIGATIONS OF USES OF COMPOUNDS OF THE INVENTION

Testing of applications of transesterification products of the invention was carried out with respect to their characterisitics as emulsifiers for water/oil emulsions or wax emulsions.

EXAMPLE I

To prepare the emulsion, 500 ml of water are added to a 1,000 cc glass vessel and heated to 90° C. Parallel to this, 30 g of paraffin oil with a viscosity of 200 cps are mixed with 9.5 g of the product from Example 9 B and the mixture obtained is also heated to 90° C. The emulsion is prepared by adding the paraffin/emulsifier mixture dropwise to the water in the glass vessel while stirring at high-speed using a dispersing disk. At the end of the addition, the emulsion formed is cooled very rapidly to room temperature (shock cooling) while continuing the stirring.

Examples II TO XX AND V1 TO V5

Various oils or waxes are converted into emulsions with different transesterification products by the method of Example 1. Some emulsions are prepared by using at the same time a nonionic emulsifier of the ethoxylated fatty alcohol type (stearyl alcohol with 2 moles of ethylene oxide), in which case, 4 g of the inventive emulsifier and 5.5 g of the nonionic coemulsifier are used instead of 9.5 g of the inventive emulsifier.

In a comparison trial, dimethylstearylammoniun propionate, as an emulsifier of the state of the art, as well as the product (copolymer) of Example 39 are checked.

In the following Table 4, there is a description of the emulsifiers or coemulsifiers used, the emulsified oil, the particle size of the disperse phase, the stability and the findings of the skin irritation test.

Stable emulsions can be produced with all the emulsifiers used. The determination of the particle size distribution reveals that 90% of the particles have a diameter of less than 8 mμ. The particle size distribution ascertained points to a good emulsion stability especially of the emulsions obtained with the inventive emulsifiers.

The essential advantage of the inventive emulsifiers over the products of the state of the art, however, is that no stimulations or irritations were observed upon skin contract. The skin irritation tests are negative when the inventive transesterification products are used. On the other hand, with products of the state of the art, considerable irritations or stimulations are observed in some cases.

TABLE 4

| Application Example No. | Emulsifier from Example No. | Co-Emulsifier | Emulsified Oil | Stability of Emulsion | Particle Size <8 μm (%) | Skin Irritation Test |
|---|---|---|---|---|---|---|
| I | 9 B | — | PAR | OK | 98.1 | Negative |
| II | 9 B | STA/ZEO | PAR | OK | 99.9 | Negative |
| III | 9 B | — | GLYTO | OK | 100.0 | Negative |
| IV | 9 B | STA/ZEO | GLYTO | OK | 100.0 | Negative |
| V | 9 B | STA/ZEO | PBD | OK | 99.0 | Negative |
| VI | 9 B | — | KSL | OK | 100.0 | Negative |
| VII | 9 B | STA/ZEO | KSL | OK | 99.5 | Negative |
| VIII | 23 B | — | GLYTO | OK | 90.2 | Negative |
| IX | 24 B | — | GLYTO | OK | 95.1 | Negative |
| X | 14 B | — | GLYTO | OK | 99.8 | Negative |
| XI | 33 B | — | GLYTO | OK | 90.5 | Negative |
| XII | 12 B | — | GLYTO | OK | 100.0 | Negative |
| XIII | 13 B | — | GLYTO | OK | 99.9 | Negative |
| XIV | 15 B | — | GLYTO | OK | 91.5 | Negative |
| XV | 16 B | — | GLYTO | OK | 100.0 | Negative |
| XVI | 18 B | — | GLYTO | OK | 99.7 | Negative |
| XVII | 28 B | — | GLYTO | OK | 96.7 | Negative |
| XVIII | 34 B | — | GLYTO | OK | 99.2 | Negative |
| XIX | 36 B | — | GLYTO | OK | 92.5 | Negative |
| XX | 25 B | — | GLYTO | OK | 99.3 | Negative |
| V1 | 39 | — | GLYTO | OK | 96.7 | S.I. |
| V2 | DMSAP | STA/ZEO | PAR | OK | 96.9 | I. |
| V3 | DMSAP | STA/ZEO | PBD | OK | 96.8 | C.S. |
| V4 | DMSAP | STA/ZEO | KSL | OK | 90.3 | C.S. |
| V5 | DMSAP | STA/ZEO | GLYTO | OK | 100.0 | S. |

Key for Table 4:
STA/ZEO=stearyl alcohol diglycol

DMSAP=dimethylstearylammonium propionate
PAR=paraffin oil, 200 cps
GLYTO=glycerin trioleate
PBD=polybutadiene, liquid, MW=1800
KSL=KSL ester wax
S.I.=slight irritation
I.=irritation
S.=stimulation
C.S.=considerable stimulation

We claim:

1. Polyacrylate esters with ammonium salt groups obtained by the transesterification of alkyl polyacrylates produced by free radical polymerization, wherein the alkyl groups of the acrylate esters have 1 to 8 carbon atoms, up to 50% of the acrylate ester may be replaced by the corresponding methacrylate ester and the transesterification is carried out in the presence of a transesterification catalyst, at a temperature of 70° to 140° C., optionally in the presence of a solvent, with a) a component which is a compound of the formula

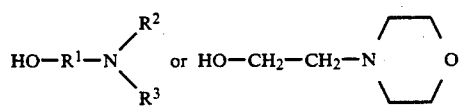

wherein $R^1$ is a divalent group of the formula $-(CH_2)_q-$, $-CH(R^4)-CH_2-$ or $-(C_nH_{2n}O)_m-C_pH_{2p}-$, in which $R^4$ is an alkyl group with 1 to 16 carbon atoms, q=2, 3 or 4, n=2, 3 or 4, m=1 to 20, p=2, 3 or 4 and $R^2$ and $R^3$ are alkyl groups with 1 to 18 carbon atoms and b) a component which is a saturated or unsaturated aliphatic alcohols with 8 to 22 carbon atoms or alkoxylated alkylphenols with 9 to 27 carbon atoms in the alklylphenol group, wherein the molar ratio of component a) to component b) is 1:9 to 9:1, in such amounts that 5 to 70% of the ester groups are transesterified, and subsequently the transesterification product is transformed into the corresponding salt by reaction with an organic carboxylic acid having 1 to 6 carbon atoms or an inorganic acid.

2. The polyacrylate esters of claim 1 obtained by the transesterification of alkyl polyacrylate esters with a mixture of a) dialkylaminoalkanols and b) a component selected from aliphatic alcohols having a chain length of 8 to 22 atoms or alkoxylated alkyl phenols, in such amount that 20 to 70% of the ester groups are transesterified and subsequent transformation into a salt.

3. The polyacrylate esters of claim 1 obtained by the transesterification of alkyl polyacrylate esters with a mixture of a) dialkylaminoalkanols and b) a component selected from aliphatic alcholols having a chain length of 10 to 18 carbon atoms or alkoxylated alkyl phenols, in such amount that 30 to 70% of the ester groups are transesterified and the subsequent transformation into a salt.

4. The polyacrylate esters of claim 1 obtained by the transesterification of alkyl polyacrylate esters with a mixture of a) dialkylaminoalcohols and b) a component selected from aliphatic alcohols or alkoxylated alkylphenols, wherein the molar ratio of component a) to component b) is 1:3 to 3:1 and the subsequent transfromation into a salt.

5. The polyacrylate esters of claim 1 in which component b) is an alkoxylated alkylphenol with, on the average, 1 to 10 oxyethylene groups.

6. The polyacrylate esters of claim 1 in which component b) is an alkoxylated alkylphenol with, on the average, 1 to 3 oxyethylene groups.

7. The polyacrylate esters of claim 1, which have an average molecular weight of 1,000 to 50,000.

8. The polyacrylate esters of claim 1, in which the transesterification product is reacted with an aliphatic carboxylic acid having 1 to 6 carbon atoms or phosphoric acid to form the corresponding salt.

9. A cationic surfactant comprising a polyacrylate ester with ammonium salt groups as defined in claim 1.

10. An active ingredient of a metal adjuvant comprising a cationic surfactant which is a polyacrylate ester with ammonium salt groups as defined in claim 1.

* * * * *